(12) United States Patent
Clonch et al.

(10) Patent No.: US 6,264,262 B1
(45) Date of Patent: Jul. 24, 2001

(54) TAILGATE DESIGN

(75) Inventors: David M. Clonch, Beckley, WV (US); Fred T. Adkins, Bristol; Fred D. Boyd, Pounding Mill, both of VA (US)

(73) Assignee: Long-Airdox Company, Oak Hill, WV (US)

( * ) Notice: Subject to any disclaimer, the term of this patent is extended or adjusted under 35 U.S.C. 154(b) by 0 days.

(21) Appl. No.: 09/113,672

(22) Filed: Jul. 10, 1998

(51) Int. Cl.⁷ ............................................ B62D 3/023
(52) U.S. Cl. ................................... 296/51; 296/184
(58) Field of Search ........................ 296/50, 51, 56, 296/57.1, 184; 298/23 MD, 29, 30

(56) References Cited

U.S. PATENT DOCUMENTS

| | | | |
|---|---|---|---|
| 815,454 | * | 3/1906 | Miller ...................................... 296/51 |
| 1,720,429 | * | 7/1929 | Nein ......................................... 296/51 |
| 2,260,504 | * | 10/1941 | Barrett ..................................... 296/51 |
| 2,645,522 | * | 7/1953 | Kersey ................................. 296/51 X |
| 4,141,582 | * | 2/1979 | Streeter .................................. 296/50 |
| 4,691,956 | * | 9/1987 | Hodge ..................................... 296/51 |
| 5,518,287 | * | 5/1996 | Totani ................................. 296/57.1 |
| 5,909,780 | * | 3/1999 | De Andrade . | |

* cited by examiner

Primary Examiner—Dennis H. Pedder
(74) Attorney, Agent, or Firm—Piper Marbury Rudnick & Wolfe

(57) ABSTRACT

A mining vehicle with an improved tailgate design for raising the tailgate above or lowering the tailgate below the mining vehicle depending on operating conditions. The tailgate is comprised of a tailgate door and at least one side bracket which is coupled to the mining vehicle via a respective pivot point. At least one forward hydraulic cylinder is pivotally coupled at a first end to the at least one side bracket and the second end pivotally coupled to the vehicle at a respective first attachment point. The tailgate is further comprised of at least one pivot point hydraulic cylinder, having a first end pivotally coupled to the tailgate door and a second end coupled to the vehicle, such that the tailgate can be raised above or lowered below the mining vehicle as desired.

17 Claims, 8 Drawing Sheets

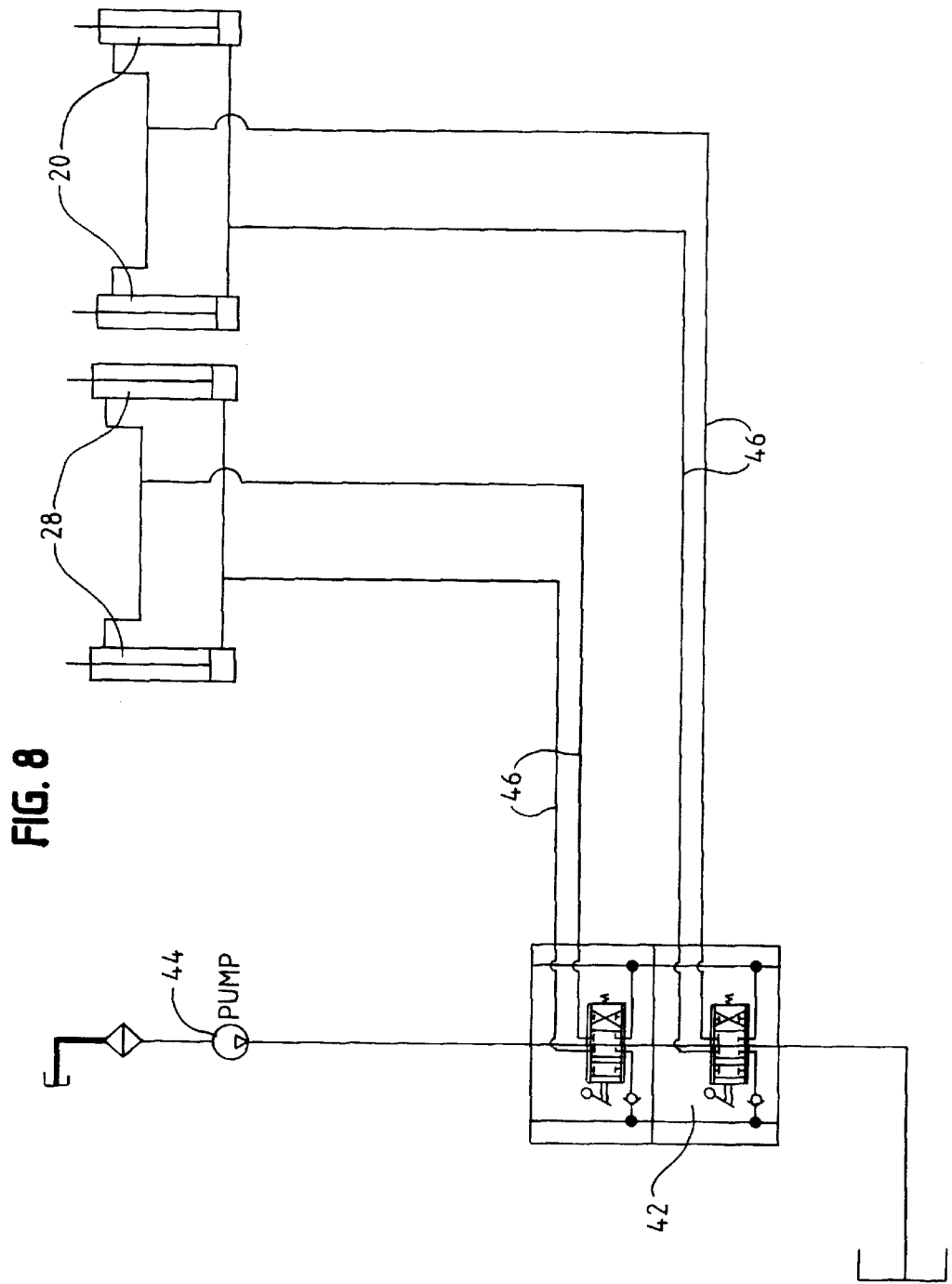

TAILGATE DESIGN

FIELD OF THE INVENTION

The present invention relates generally to mining vehicles with tailgates, and more particularly to mining vehicles and the mechanism for operating the tailgates.

BACKGROUND ART

The use of a tailgate structure for domestic and industrial vehicles is well known in the art. For instance, tailgates are used with mining vehicles, such as coal haulers. Coal haulers receive coal, ore, and other materials from a vehicle, such as a continuous miner. The coal is then transported via the coal hauler to a dump point, such as a belt conveyor. The coal may be loaded onto the belt conveyor via a hopper with a feeder breaker.

In coal haulers, it is known to provide a tailgate which is hinged at the bottom, inside portion of the frame opening. The tailgate is held in an upright closed position by means of hydraulic cylinders. The coal hauler is loaded with the tailgate in the closed position and unloaded with the tailgate in the opened position.

Such prior art coal haulers suffer several disadvantages. With the tailgate extending beyond the mining vehicle body in an open position, the tailgate may become damaged when backing towards an ore receptacle or feeder apparatus. Additionally, while extending outwardly from the vehicle body, the tailgate is significantly exposed to the discharge stream of materials, thus increasing wear and damage to the tailgate. In addition, it is necessary to clean any remaining materials off of the opened tailgate.

It is also known to provide mining vehicles with a tailgate which is operated between a closed position and a position substantially above the mining vehicle. Such prior art tailgates operate adequately when discharging materials at a feeder or receptacle. However, when the vehicle is used to haul supplies, such as batteries, rock dust, or crib blocks, the size of the supplies to be hauled is limited to the clearance between the bottom of the raised tailgate and the bottom edge of the vehicle. In addition, the use of such vehicles is limited in mines where the overhead clearance is not sufficient to raise the tailgate to the fully opened position.

The prior art is replete with references for tailgate designs that can be operated in either a top-opening or a bottom-opening mode. Such "dual-opening mode" designs are frequently seen in connection with automobiles and refuse hauling and disposal vehicles. While functional for these and other types applications, such designs are not adaptable for use with mining vehicles.

SUMMARY OF THE INVENTION

It is an object of the present invention to provide a mining vehicle which overcomes the problems of the prior art mining vehicle.

It is another object of the present invention to provide a mining vehicle with a tailgate which can operate in either a top-opening mode or a bottom-opening mode as desired.

It is an additional object of the present invention to provide a mining vehicle with a tailgate which will not limit the size of supplies to be hauled.

It is a further object of present invention to provide a mining vehicle with a tailgate, which is fully operational even in situations wherein the overhead clearance is restricted.

It is still a further object of the invention to provide a mining vehicle with a tailgate which will not be damaged, during the unloading operation.

Still a further object is to provide a mining vehicle with a tailgate which requires minimum or no cleaning after an unloading operation.

The present invention therefore provides a mining vehicle with a tailgate secured thereto and means for operating the tailgate in either a top-opening or bottom-opening mode, such that the tailgate can be raised above or lowered below the vehicle as required by the operating environment.

BRIEF DESCRIPTION OF THE DRAWINGS

FIG. 8 is a schematic depicting the control means to actuate the two pairs of hydraulic cylinders.

DETAILED DESCRIPTION OF THE INVENTION

Figure 1:
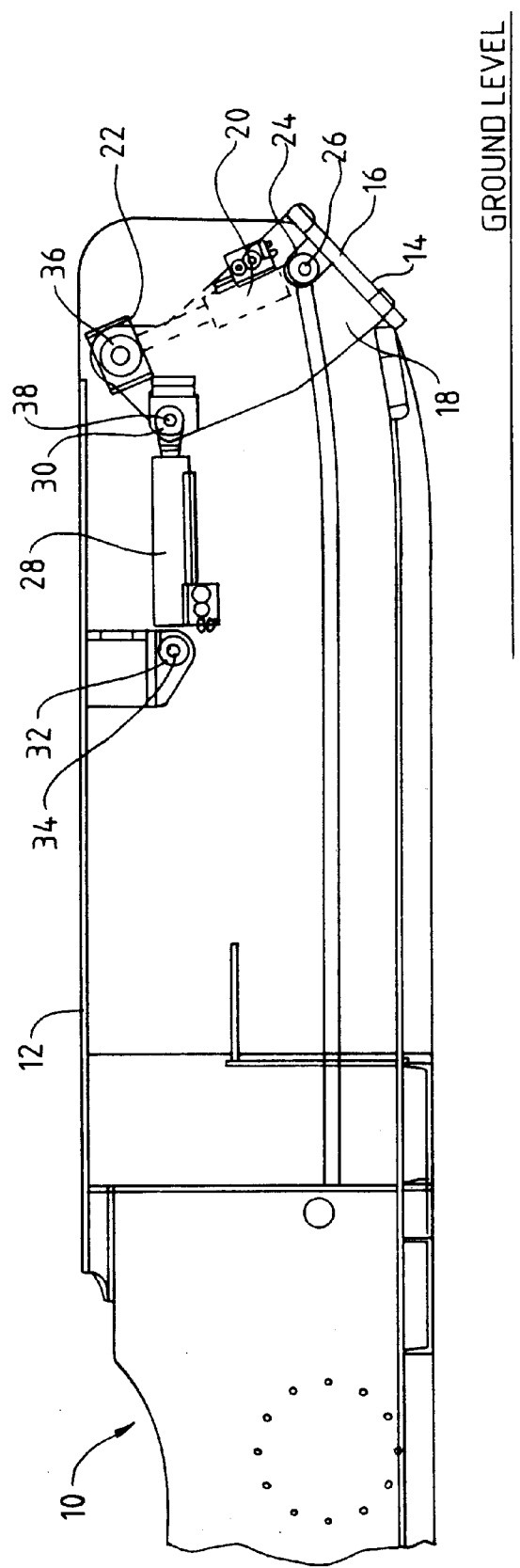
FIG. 1 is a side perspective of a mining vehicle with the improved tailgate in the fully closed position.

Referring now to FIG. 1, there is illustrated a mining vehicle 10, defined generally by a body 12 and a tailgate 14 which is comprised of a tailgate door 16 and side brackets 18. A pair of linear thrust means 20, each having a first end 22 and a second end 24, are attached to the sides of the body 12 at attachment points 26. Another pair of linear thrust means 28, each having a first end 30 and a second end 32, are attached to the sides near the top of the body at attachment points 34. In the preferred embodiment, the linear thrust means are hydraulic cylinders. The side brackets 18 of tailgate 14 are pivotally attached to the linear thrust means 20 by movable pivot points 36. Tailgate 14 is pivotally attached to the linear thrust means 28 at attachment points 38. In the closed position, thrust means 20 are fully extended such that the movable pivots 36 are held in the highest position, while thrust means 28 remain retracted.

Figure 2:
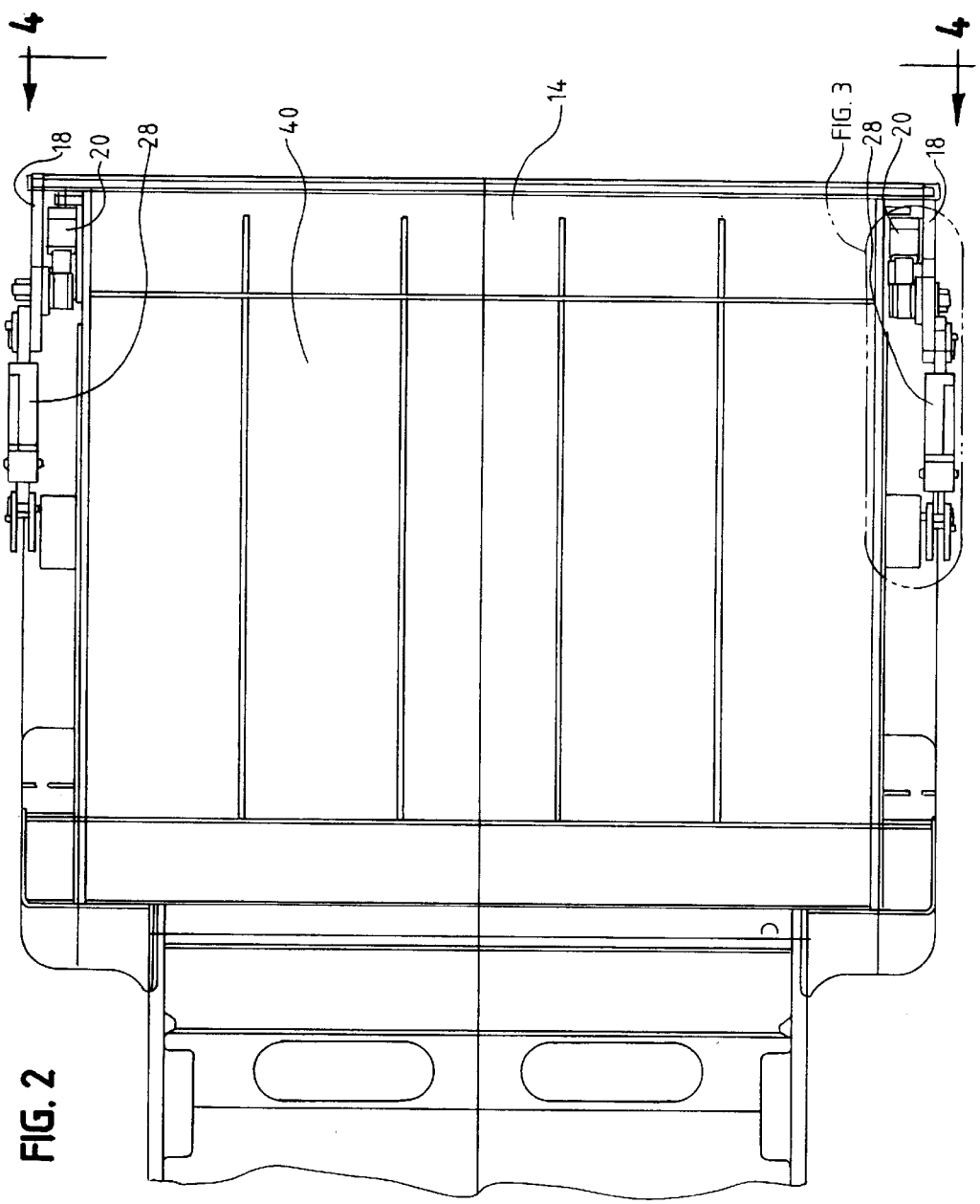
FIG. 2 is a top perspective of the mining vehicle of FIG. 1.
Figure 3:
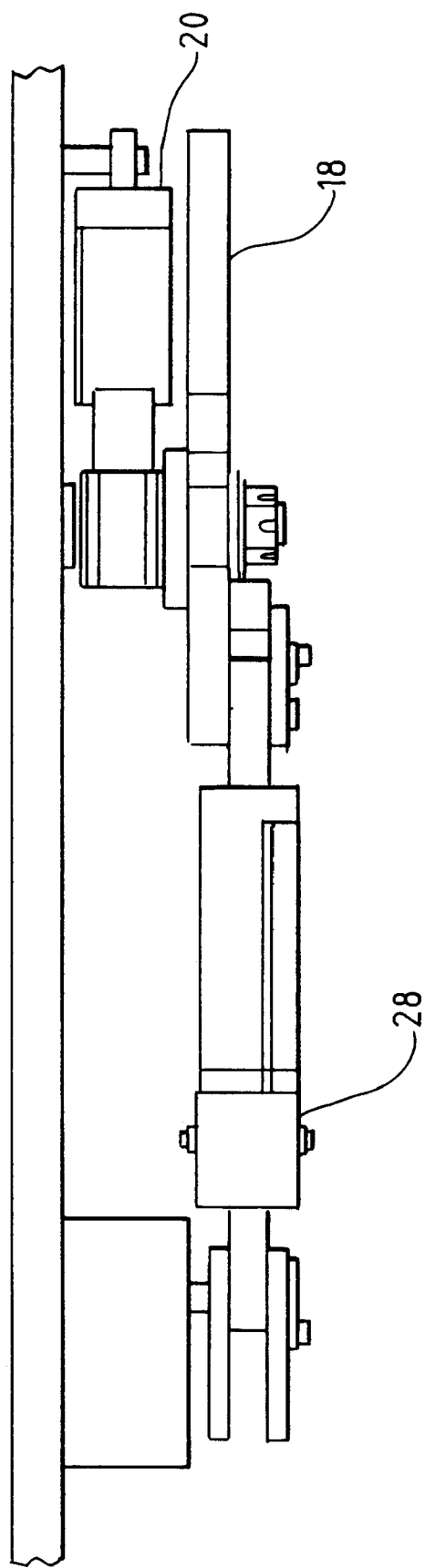
FIG. 3 is an enlarged view of portion A of FIG. 2 illustrating the relationship of the linear thrust means.
Figure 4:
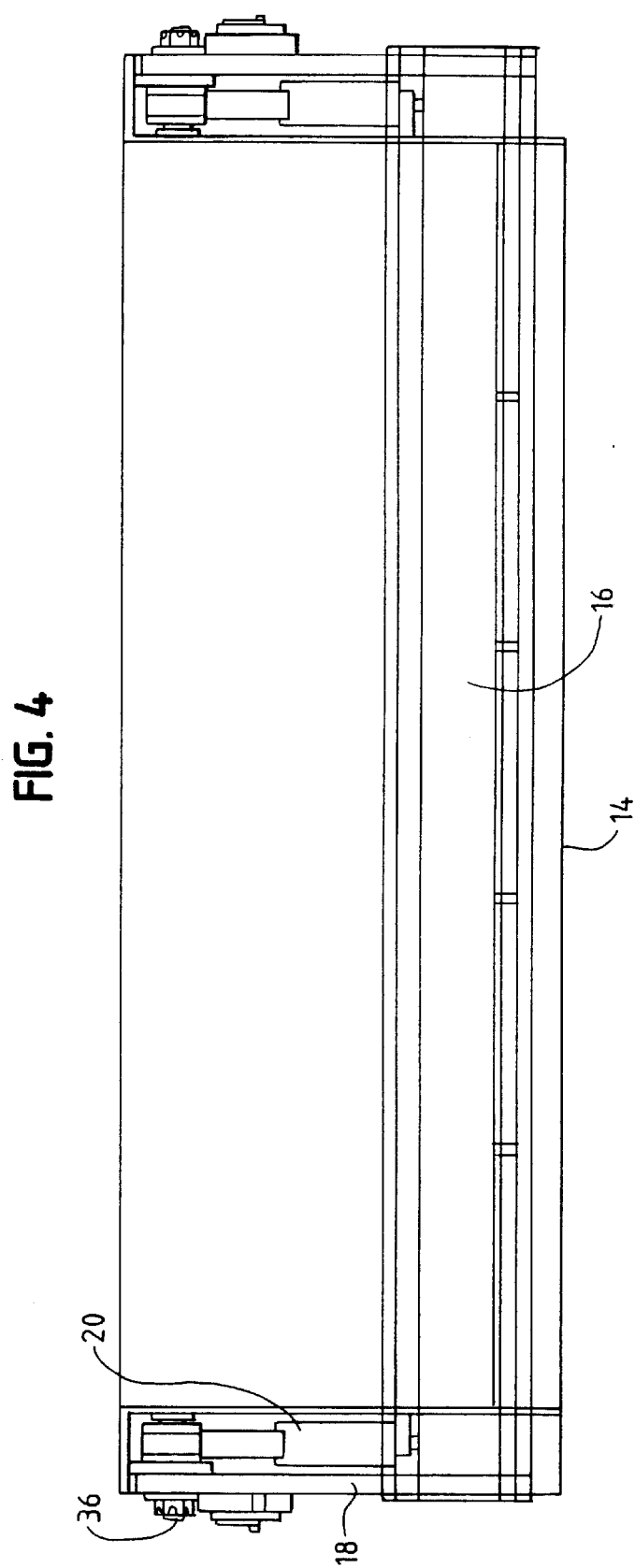
FIG. 4 is a rear perspective of the mining vehicle taken along line 4—4 of FIG. 2, with the improved tailgate.

Looking at the mining vehicle from above, FIG. 2 better illustrates the arrangement of the two pairs of linear thrust means, 20 and 28 respectively, in relation to the tailgate 14, and the ore hauling bed 40. FIG. 3, shows an enlarged view of a detail of FIG. 2. FIG. 4 provides a rear view of the vehicle, and shows linear thrust means 20 coupled between the tailgate 14 and the movable pivot points 36.

Figure 5:
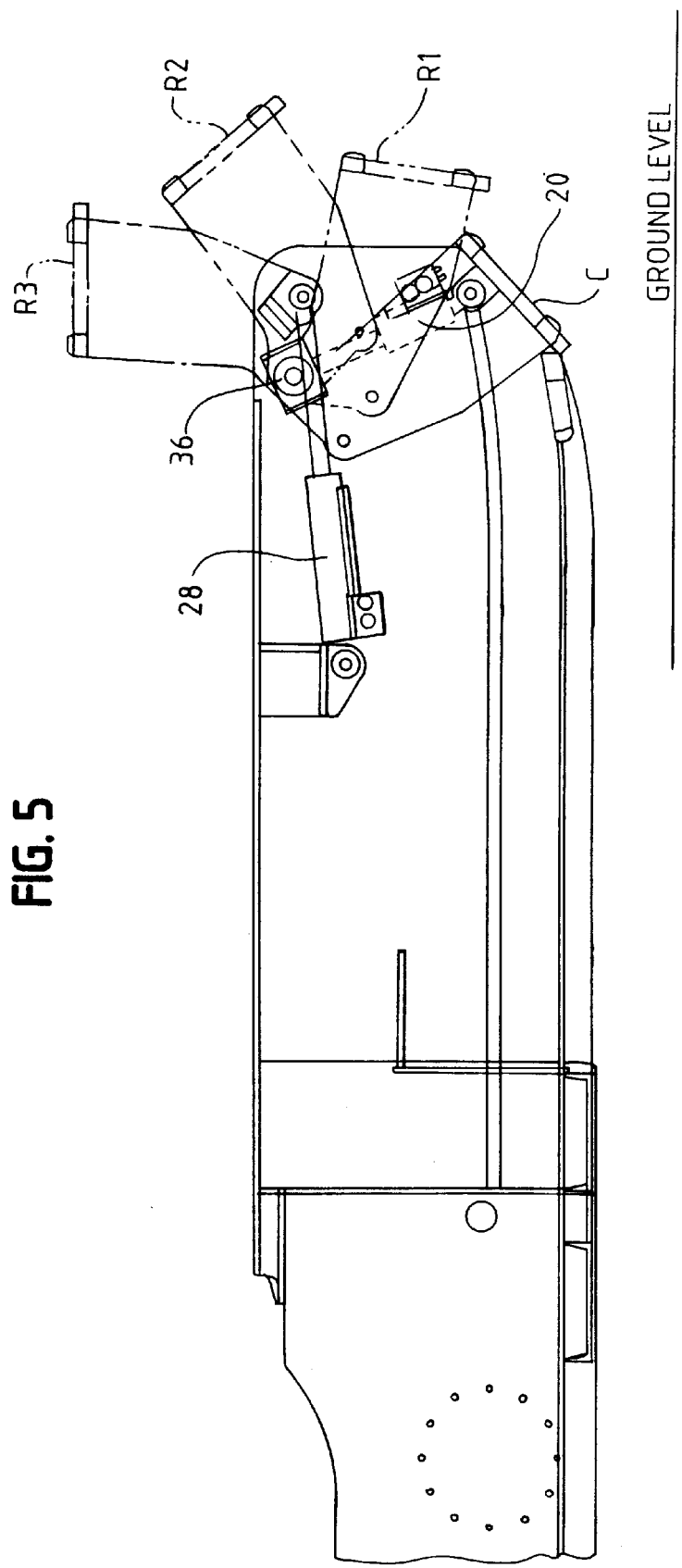
FIG. 5 is a side perspective of the mining vehicle illustrating the improved tailgate moving from a closed position to a fully raised position.

In order to raise the tailgate from the closed position of FIG. 1 and operate in a top-opening mode, as shown in FIG. 5, linear thrust means 20 remain extended and continue to maintain the movable pivot points 36 in the highest position while simultaneously, the other pair of linear thrust means 28 extend, moving tailgate 14 such that it rotates counterclockwise (as viewed from FIG. 5) about pivot points 36 and outward to a position $R_1$. As the other pair of linear thrust means 28 extend further, tailgate 14 continues to pivot counter-clockwise about pivot points 36 and outward, to position $R_2$ and finally to the fully raised position $R_3$. To move the tailgate back to a closed position, thrust means 28 are retracted, and the above described process is carried out in the reversed order.

Figure 6:
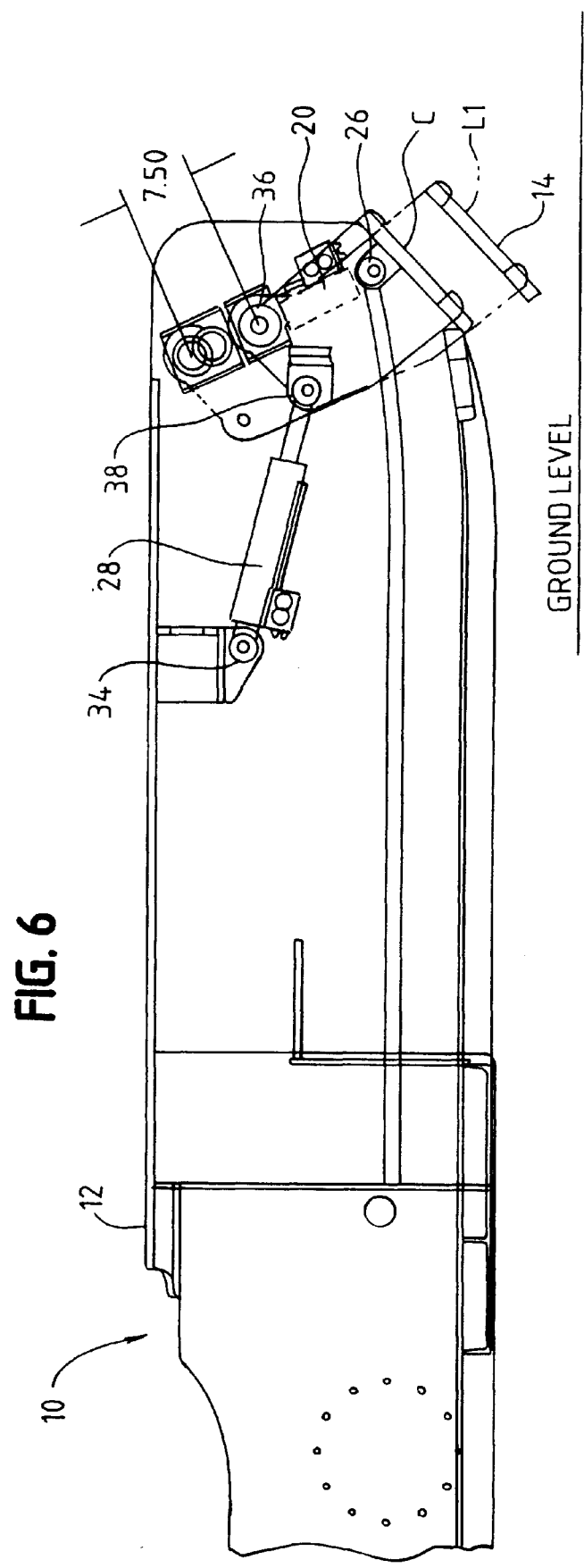
FIG. 6 is a side perspective of the mining vehicle illustrating the improved tailgate moving from a closed position to a position intermediate of the closed and fully lowered positions.
Figure 7:
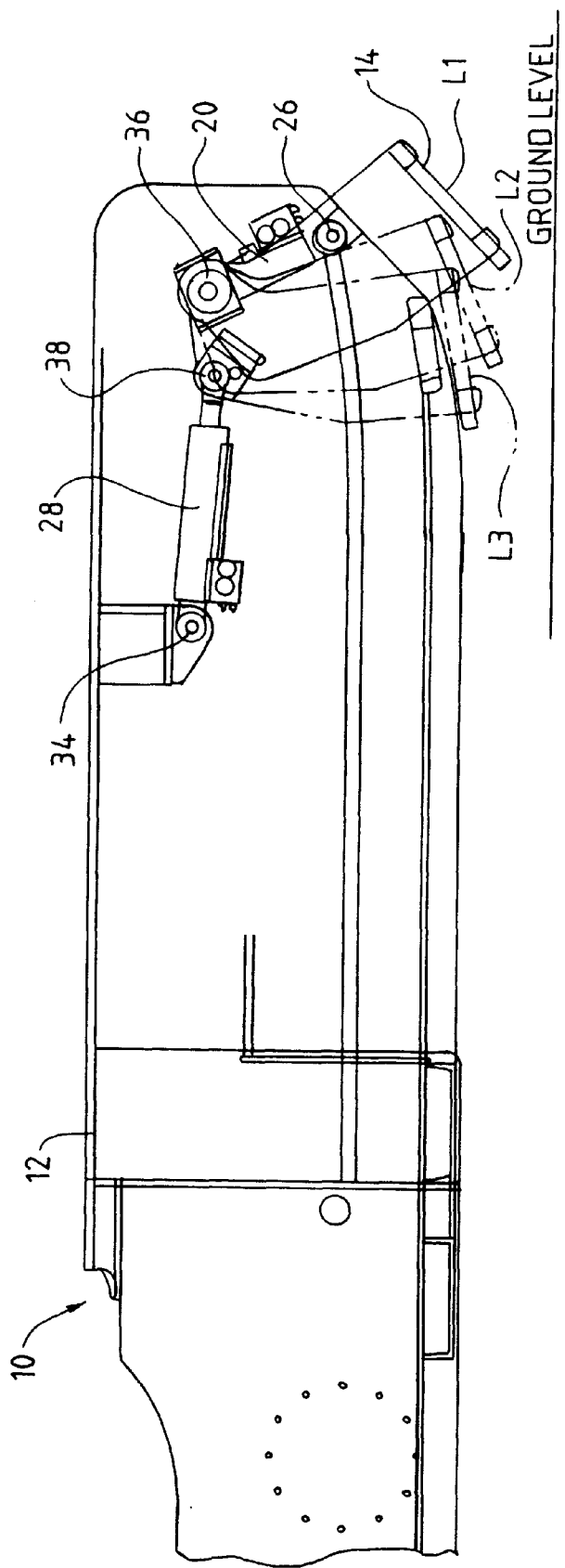
FIG. 7 is a side perspective of a mining vehicle illustrating the improved tailgate moving from the intermediate position of FIG. 6 to a fully lowered position.

Operating the tailgate in a bottom-opening mode to achieve a fully lowered position is a two-step process, as illustrated in FIGS. 6 and 7. Again, the operation begins with the tailgate 14 in the closed position of FIG. 1. Referring to FIG. 6, the two pairs of linear thrust means 20 and 28 are actuated. In this mode thrust means 20 serves as tailgate extending means by retracting the moveable pivot points 36 to the lowest position, or at least to a position where the tailgate 14 will clear the bottom of the body 12. Concurrently, linear thrust means 28 extends to maintain the angular position of the tailgate with respect to the vehicle 10. The combined action of thrust means 20 and 28 move the tailgate 14 from the closed position C to or at least towards a lowered or pivot sump position $L_1$.

Referring now to FIG. 7, once linear thrust means 20 are fully retracted and the movable pivot points 36 reach their lowest position, linear thrust means 28 begin to retract. As this retraction commences, tailgate 14 pivots clockwise (as viewed from FIG. 7) about pivot points 36 to a position $L_2$. When linear thrust means 28 are fully retracted, tailgate 14 will be lowered to a final position $L_3$ located under the vehicle body 12. To close the tailgate, the previous detailed sequence is reversed.

The sequence of operating the linear thrust means 20 and 28 during the bottom opening mode may vary from that described above in connection with FIGS. 5, 6, and 7 as understood by one skilled in the art.

Further, the placement of the linear thrust means 20, 28 may differ from that shown in the drawings. For example, with reference to FIG. 1, in a mining vehicle 10 with a body 12 higher than that shown, the side brackets 18 may extend upward beyond the pivot points 36. With the modified brackets, the location of the ends 30, 32 of linear thrust means 28 may be relocated above the pivot points 36. The linear thrust means 28 would operate in the reverse order from that described above. For instance, the linear thrust means 28 would retract for a particular movement whereas the modified linear thrust means 28 would extend.

FIG. 8 depicts a schematic of the actuation system for the first and second pair of linear thrust means 20 and 28, which are hydraulic cylinders in the preferred embodiment of the invention. As is well known in the art, a controller 42 regulates hydraulic pressure created by pump 44. The regulated pressure is then transferred to the thrust means 20 and 28 via hydraulic lines 46.

While the preferred embodiments of the invention have been shown and described, it will be apparent to those skilled in the art that numerous variations or modifications may be made in these embodiments without departing from the spirit of the present invention.

As such, the scope of the invention is set forth in the following claims:

1. A tailgate apparatus for a mining vehicle, comprising: a tailgate to be secured to the mining vehicle and means for operating the tailgate in either a top-opening or bottom-opening mode, whereby the tailgate can be raised above or lowered below the mining vehicle as desired;

wherein the operating means includes a means for pivoting the tailgate between a closed position and a position above the mining vehicle and between an extended position and a position below the mining vehicle; and wherein the pivoting means includes a means for extending the tailgate between a closed position and the extended position spaced from the mining vehicle and a means for maintaining an angular position of the tailgate with respect to the mining vehicle while extending the tailgate between the closed and extended positions, whereby the tailgate may operate in the top-opening mode from the closed position and in the bottom-opening mode from the extended position.

2. The tailgate apparatus of claim 1 wherein the pivoting means includes at least one movable pivot point on the tailgate for pivoting the tailgate between the extended position and a lower position below the mining vehicle, a means for moving the tailgate about the at least one movable pivot point between the extended position and the lower position, and a means for positioning the at least one movable pivot point, whereby the tailgate is capable of operating in the bottom-opening mode.

3. The tailgate apparatus of claim 2, wherein the angular position maintaining means and the tailgate moving means include a first linear thrust means, and the extending means and the movable pivot point positioning means include a second linear thrust means.

4. The tailgate apparatus of claim 3, wherein the first linear thrust means includes a first end coupled to the tailgate and a second end for coupling to the mining vehicle at a first point of attachment, and the second linear thrust means includes one end coupled to the tailgate at the movable pivot point and a second end for coupling to the mining vehicle at a second point of attachment.

5. The tailgate apparatus of claim 4 wherein the first linear thrust means is a first hydraulic cylinder and the second linear thrust means is a second hydraulic cylinder.

6. The tailgate apparatus of claim 5, wherein the tailgate includes a tailgate door and first and second tailgate side brackets, the first and second tailgate side brackets extending in a substantially vertical plane, and with the tailgate in a closed position, the at least one movable pivot point is located at an upper portion of one of the first and second tailgate side brackets, the first end of the first linear thrust means is located on one of the first and second tailgate side brackets forward and below the at least one movable pivot point, the second end of the second linear thrust means is located below and behind the at least one movable pivot point.

7. The tailgate apparatus of claim 6 having a means for controlling the first and second hydraulic cylinders.

8. A mining vehicle with a tailgate, comprising:
a tailgate having a tailgate door and at least one side bracket, the at least one side bracket extending substantially within a vertical plane, each of the at least one side brackets coupled to a respective pivot point;
at least one forward hydraulic cylinder having a first end pivotally coupled to the at least one side bracket and with the tailgate in a closed position, the first end is located forward and below the respective pivot point, and a second end pivotally coupled to the vehicle at a respective first attachment point; and
at least one pivot point hydraulic cylinder having a first end pivotally coupled to the at least one side bracket of the tailgate at the respective pivot point, and a second end coupled to the vehicle and with the tailgate in a closed position, the second end is located below and behind the pivot point at a respective second point of attachment, whereby the tailgate can be raised above or lowered below the mining vehicle as desired.

9. The mining vehicle of claim 8, wherein the tailgate door, in a closed position, extends in a plane substantially at a 45 degree angle with respect to a horizontal plane of the vehicle, the first end of the at least one forward hydraulic cylinder is located at an upper portion of the at least one side bracket, and the second point of attachment is located forward from the first end of the at least one forward hydraulic cylinder.

10. The mining vehicle of claim 9, wherein each of the hydraulic cylinders include hydraulic controls.

11. The mining vehicle of claim 10, wherein with the tailgate in a fully closed position, the at least one forward hydraulic cylinder is in a substantially fully retracted position and the at least one pivot point hydraulic cylinder is in a substantially fully extended position, and from a fully closed position to a fully raised position, the at least one forward hydraulic cylinder has been moved to a substantially fully extended position, and from a fully closed position to a fully lowered position, the at least one pivot point hydraulic cylinder has been moved to a substantially fully retracted position, and the at least one forward hydraulic cylinder has been moved to a substantially fully retracted position, whereby the tailgate can be operated in either a top-opening or bottom-opening mode as desired.

12. A tailgate apparatus for a mining vehicle, comprising:
a tailgate having a tailgate door and first and second tailgate side brackets, the first and second side brackets coupled to the mining vehicle;
at least one movable pivot point on either the first or second side brackets;
a first means coupled to the vehicle and the movable pivot point for raising the movable pivot point, relative to the vehicle, to an upper position in preparation for raising the tailgate and for lowering the movable pivot point, relative to the vehicle, to a lower position in preparation for lowering the tailgate; and
a second means coupled to the vehicle and to either the first or second side brackets for raising the tailgate with the movable pivot point in the upper position and for lowering the tailgate with the movable pivot point in the lower position.

13. The tailgate apparatus of claim 12 wherein the first means includes a first linear thrust means having one end coupled to the tailgate at the at least one movable pivot point and a second end for coupling to the vehicle at a first point of attachment and a second linear thrust means having one end coupled to the tailgate at the at least one side brackets and a second end for coupling to the vehicle at a second point of attachment.

14. The tailgate apparatus of claim 13 wherein the first linear thrust means is a first hydraulic cylinder and the second linear thrust means is a second hydraulic cylinder.

15. The tailgate apparatus of claim 14 having a means for controlling the first and second hydraulic cylinders.

16. The tailgate apparatus of claim 1, wherein the pivoting means includes at least one movable pivot point on the tailgate for pivoting the tailgate between the closed position and the position above the mining vehicle, means for positioning the at least one moveable pivot point, and the means for moving the tailgate about the at least one moveable pivot point between the closed position and the position above the mining vehicle, whereby the tailgate is capable of operating in the top-opening mode.

17. The tailgate apparatus of claim 16, wherein the tailgate moving means includes a first linear thrust means; and the moveable pivot point positioning means includes a second linear thrust means.

* * * * *